(12) United States Patent
Ueno et al.

(10) Patent No.: US 10,606,392 B2
(45) Date of Patent: Mar. 31, 2020

(54) ELECTRONIC DEVICE, CONTROL METHOD, AND NON-TRANSITORY STORAGE MEDIUM

(71) Applicant: KYOCERA Corporation, Kyoto-shi, Kyoto (JP)

(72) Inventors: Yasuhiro Ueno, Yokohama (JP); Shigeki Tanabe, Yokohama (JP); Hideki Morita, Yokohama (JP); Isao Masuike, Machida (JP); Koutaro Yamauchi, Yokohama (JP); Manabu Sakuma, Yokohama (JP)

(73) Assignee: KYOCERA CORPORATION, Kyoto (JP)

(*) Notice: Subject to any disclaimer, the term of this patent is extended or adjusted under 35 U.S.C. 154(b) by 21 days.

(21) Appl. No.: 15/955,597

(22) Filed: Apr. 17, 2018

(65) Prior Publication Data

US 2018/0300001 A1   Oct. 18, 2018

(30) Foreign Application Priority Data

Apr. 18, 2017   (JP) ................. 2017-082016

(51) Int. Cl.
| | | |
|---|---|---|
| *G06F 3/041* | (2006.01) | |
| *G06F 3/044* | (2006.01) | |
| *G06F 3/16* | (2006.01) | |
| *G06F 21/00* | (2013.01) | |
| *G06K 9/00* | (2006.01) | |

(52) U.S. Cl.
CPC ............ *G06F 3/0412* (2013.01); *G06F 3/044* (2013.01); *G06F 3/0416* (2013.01); *G06F 3/167* (2013.01); *G06F 21/00* (2013.01); *G06K 9/00013* (2013.01); *G06K 9/00087* (2013.01); *G06F 2203/0381* (2013.01)

(58) Field of Classification Search
CPC ...... G06F 3/0412; G06F 3/0416; G06F 3/044; G06F 3/167; G06F 21/00; G06F 2203/0381; G06K 9/00016; G06K 9/00087
See application file for complete search history.

(56) References Cited

U.S. PATENT DOCUMENTS

| | | | | |
|---|---|---|---|---|
| 9,134,866 | B2* | 9/2015 | Andersson | G06F 3/044 |
| 9,207,804 | B2* | 12/2015 | Cudak | G06F 3/0418 |
| 9,595,029 | B1* | 3/2017 | Catoe | G06Q 20/18 |
| 9,706,088 | B2* | 7/2017 | Jing | H04N 5/2252 |
| 9,983,675 | B2* | 5/2018 | Shah | G06F 3/0416 |
| 2012/0146924 | A1* | 6/2012 | Inoue | G06F 3/0418 345/173 |
| 2012/0249470 | A1* | 10/2012 | Sugiura | G06F 1/1643 345/174 |

(Continued)

FOREIGN PATENT DOCUMENTS

| | | |
|---|---|---|
| JP | 2016-143069 A | 8/2016 |
| JP | 2016-212605 A | 12/2016 |

*Primary Examiner* — Amare Mengistu
*Assistant Examiner* — Crystal Mathews
(74) *Attorney, Agent, or Firm* — Hauptman Ham, LLP

(57) ABSTRACT

There is provided an electronic device including at least one sensor, a sound input unit, and at least one controller, wherein when the at least one controller determines that a contact operation on the electronic device is not able to be performed based on a detection result of the sensor, the at least one controller is configured to start reception of sound input by the sound input unit to recognize the sound.

17 Claims, 6 Drawing Sheets

(56) References Cited

U.S. PATENT DOCUMENTS

| | | | |
|---|---|---|---|
| 2014/0198064 A1* | 7/2014 | Kim | G06F 3/0418 |
| | | | 345/173 |
| 2015/0046828 A1* | 2/2015 | Desai | G06F 1/163 |
| | | | 715/739 |
| 2015/0062069 A1* | 3/2015 | Shin | G06F 3/044 |
| | | | 345/174 |
| 2015/0293592 A1* | 10/2015 | Cheong | G06F 3/016 |
| | | | 345/173 |
| 2016/0042219 A1* | 2/2016 | Bae | G06K 9/00013 |
| | | | 382/124 |
| 2016/0248899 A1* | 8/2016 | Lee | G06F 3/04842 |
| 2018/0007192 A1 | 1/2018 | Tanabe et al. | |
| 2018/0059798 A1* | 3/2018 | Matsubara | B60K 35/00 |
| 2018/0107336 A1* | 4/2018 | Alberth, Jr. | G06F 3/0418 |
| 2018/0173863 A1* | 6/2018 | Andersson | G06F 21/32 |
| 2018/0253582 A1* | 9/2018 | Chen | G06K 9/00013 |
| 2019/0034001 A1* | 1/2019 | Tanabe | G06F 3/017 |

* cited by examiner

FIG.4A

| FIRST SOUND COMMAND | CORRESPONDING PROCESS |
|---|---|
| "HOME" | SHIFT TO HOME SCREEN 50 |
| "MAKE A PHONE CALL TO XXX" | CALL XXX |
| "ACTIVATE CALENDAR" | ACTIVATE CALENDAR APPLICATION |

FIG.4B

| SECOND SOUND COMMAND | CORRESPONDING PROCESS |
|---|---|
| "SCHEDULE" | DISPLAY SCHEDULE FOR WEEK |
| "E-MAIL" | DISPLAY NEWLY ARRIVED E-MAIL |
| "ACTIVATE CALENDAR" | ACTIVATE APPLICATION NAMED CALENDAR |

ELECTRONIC DEVICE, CONTROL METHOD, AND NON-TRANSITORY STORAGE MEDIUM

CROSS-REFERENCE TO RELATED APPLICATION

The present application claims priority to and incorporates by reference the entire contents of Japanese Patent Application No. 2017-082016 filed in Japan on Apr. 18, 2017.

FIELD

The present application relates to an electronic device, a control method, and a non-transitory storage medium, for providing information to a user.

BACKGROUND

Conventionally, there is disclosed an electronic device including a touch sensor that detects contact. Further, for example, there is disclosed an electronic device including a fingerprint sensor.

There is a case where a user cannot operate an electronic device by a contact operation.

SUMMARY

An electronic device, a control method, and a non-transitory storage medium are disclosed.

According to one aspect, there is provided an electronic device comprising at least one sensor, a sound input unit, and at least one controller, wherein when the at least one controller determines that a contact operation on the electronic device is not able to be performed based on a detection result of the sensor, the at least one controller is configured to start reception of sound input by the sound input unit to recognize the sound.

According to one aspect, there is provided a control method of an electronic device including a sensor, a sound input unit, and at least one controller, the control method comprising determining that, based on a detection result of the sensor, a contact operation on the electronic device is not able to be performed and starting reception of sound input by the sound input unit to recognize the sound.

According to one aspect, there is provided a non-transitory storage medium that stores a computer program for causing an electronic device including a sensor, a sound input unit, and at least one controller to execute determining that, based on a detection result of the sensor, a contact operation on the electronic device is not able to be performed and starting reception of sound input by the sound input unit to recognize the sound.

The above and other objects, features, advantages and technical and industrial significance of this application will be better understood by reading the following detailed description of presently preferred embodiments of the application, when considered in connection with the accompanying drawings.

BRIEF DESCRIPTION OF THE DRAWINGS

FIGS. 4A and 4B are tables in which sound commands and processes to be performed based on these sound commands are associated with one another;

DETAILED DESCRIPTION OF THE PREFERRED EMBODIMENTS

Embodiments of the present application will be described below in detail with reference to the drawings. The present application is not limited to the following embodiments. Constituent elements in the following descriptions include those that can be easily assumed by persons skilled in the art and substantially identical elements, which are so-called equivalents. In the descriptions of the drawings, the same elements are denoted by the same reference signs and redundant explanations thereof may be omitted.

An electronic device 1 according to embodiments of the present application described below can be assumed to be, for example, a terminal such as a so-called smartphone. However, the electronic device 1 according to the embodiments of the present application is not limited to a smartphone. Examples of the electronic device 1 also include, but are not limited to, a tablet, a personal computer, a vehicle-mounted electronic device, etc.

Figure 1:
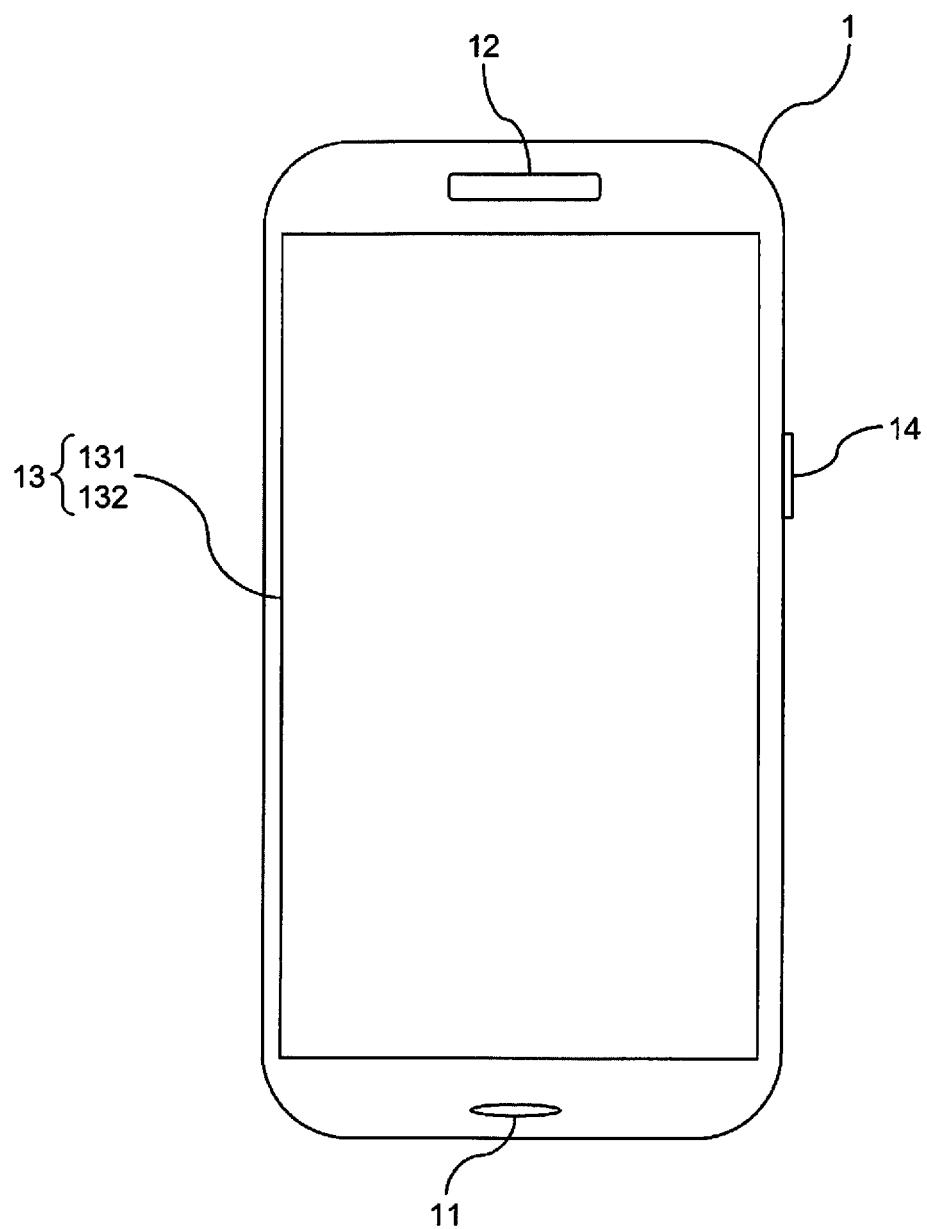
FIG. 1 is an exterior view of an electronic device according to an embodiment.

FIG. 1 is an exterior view of the electronic device 1 according to an embodiment. As illustrated in FIG. 1, the electronic device 1 includes a microphone 11 as a sound input unit, a speaker 12 as a sound output unit, a touch panel 13, and a fingerprint/thumbprint sensor 14.

The microphone 11 is a type of input means for receiving input to the electronic device 1. The microphone 11 collects sound around the electronic device 1.

The speaker 12 is a type of output means for outputting sound from the electronic device 1. The speaker 12 outputs voice on calling, information of various programs, and the like as the sound.

The touch panel 13 includes a touch sensor 131 and a display 132.

The touch sensor 131 is a type of input means for receiving input to the electronic device 1. The touch sensor 131 detects contact of a finger of a user, a stylus, and the like. While a resistive method and an electrostatic capacitance method are exemplified as a method of detecting contact, the method can be set arbitrarily.

The display 132 is a type of output means for outputting display from the electronic device 1. The display 132 displays objects such as characters, images, signs, diagrams, and the like on a screen. For example, a liquid crystal display or an organic EL (Electro Luminescence) display is used as the display 132.

On the touch panel 13 in FIG. 1, the display 132 is provided to be overlapped with the touch sensor 131, and the display area of the display 132 is overlapped with the touch sensor 131; however, the present embodiment is not limited thereto. For example, the display 132 and the touch sensor 131 can be arranged in juxtaposition or can be arranged to be separated from each other. When the display 132 and the touch sensor 131 overlap with each other, one or plural sides of the display 132 do not need to be side-by-side with any side of the touch sensor 131.

The fingerprint/thumbprint sensor 14 is a type of input means for receiving input to the electronic device 1. The fingerprint/thumbprint sensor 14 detects contact of a finger of a user and the fingerprint of the finger. While an electrostatic capacitance method and an electric-field detection method are exemplified as a method of detecting the contact of the finger of the user and the fingerprint of the finger, the method can be set arbitrarily.

Figure 3A:
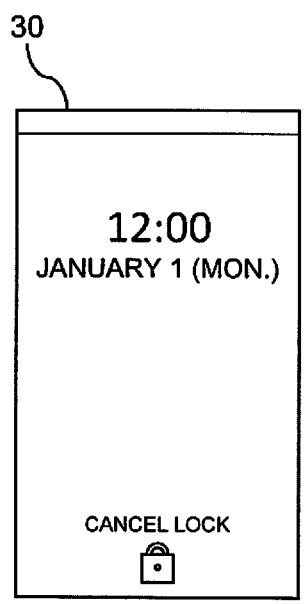
FIG. 3A to 3C are image diagrams illustrating examples of a screen displayed on the electronic device according to the embodiment.
Figure 3B:
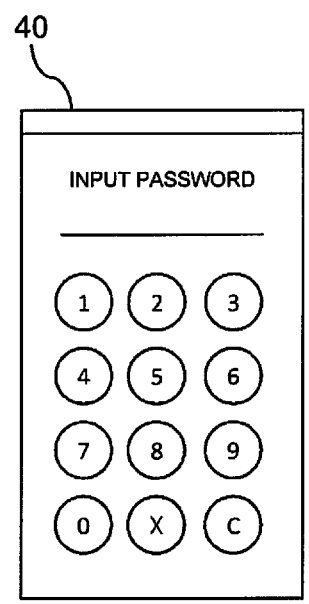
Figure 3C:
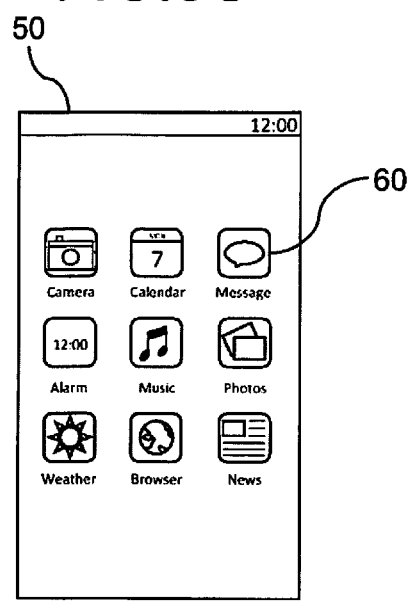

Subsequently, an example of a screen displayed on the electronic device 1 is described with reference to FIGS. 3A to 3C. FIGS. 3A to 3C are image diagrams of a screen displayed on the display 132 of the electronic device 1.

FIGS. 3A to 3C are examples of a lock screen of the electronic device 1. When the display 132 of the electronic device 1 is lighted up from an off state, a screen-lock screen illustrated in FIG. 3A is displayed on the display 132. When a predetermined touch operation is performed on a screen-lock screen 30, a screen-lock state is canceled, and a security-lock screen 40 illustrated in FIG. 3B is displayed on the display 132. For example, on the security-lock screen 40, a user is requested to input a passcode as a canceling operation. When a passcode registered in advance is input, the security-lock state is canceled. When it is set that the security-lock state is not activated in an off state, even when the screen-lock state is canceled, the security-lock screen is not displayed.

FIG. 3C illustrates an example of a home screen. A home screen 50 is displayed on the display 132. The home screen 50 is a screen that causes a user to select which application among applications installed in the electronic device 1 is to be executed. The electronic device 1 can arrange icons on the home screen 50. A plurality of icons 60 are arranged on the home screen 50 illustrated in FIG. 3C, and the respective icons 60 are associated in advance with the applications installed in the electronic device 1. The icons 60 respectively include an image and a character string. The icons 60 can respectively include a sign or a diagram instead of an image. It is also possible to configure that each of the icons 60 only includes an image or a character string.

When the security-lock state described above is canceled, for example, the home screen 50 is displayed on the display 132. For example, when an application is executed in a foreground in a state where the security lock is canceled and then the screen lock and the security lock are executed while the application is being executed, if the security-lock state is canceled thereafter, an execution screen of the application is displayed on the display 132.

In the electronic device 1, canceling of the security-lock state can be performed with fingerprint authentication of a user using the fingerprint/thumbprint sensor 14. When the security-lock state is canceled with the fingerprint authentication, the security-lock screen illustrated in FIG. 3B is not displayed. When the fingerprint authentication of the user is performed by the fingerprint/thumbprint sensor 14 in a case where the display 132 is turned off, for example, the state of the display 132 shifts from a turned-off state to the home screen 50 illustrated in FIG. 3C. For example, it is also possible that the state of the display 132 shifts from the turned-off state to the home screen 50 illustrated in FIG. 3C via the screen-lock screen 30 illustrated in FIG. 3A.

Figure 2:
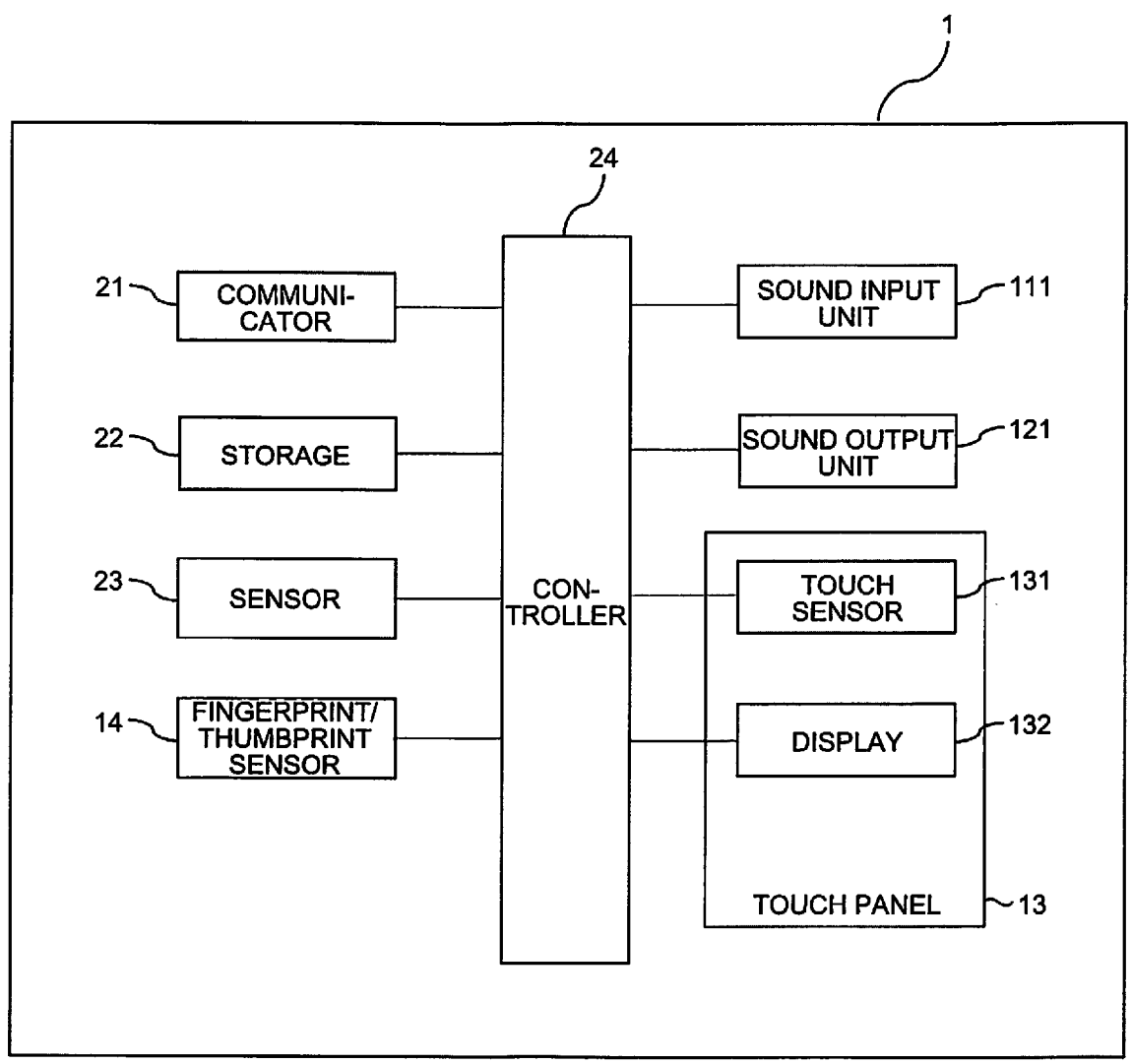
FIG. 2 is a block diagram illustrating a functional configuration of the electronic device according to the embodiment.

Subsequently, a functional configuration of the electronic device 1 is described with reference to FIG. 2. FIG. 2 is a block diagram illustrating a functional configuration of the electronic device 1. As illustrated in FIG. 2, the electronic device 1 includes a sound input unit 111, a sound output unit 121, the touch sensor 131, the display 132, the fingerprint/thumbprint sensor 14, a communicator 21, a storage 22, a sensor 23, and a controller 24.

The sound input unit 111 inputs a signal corresponding to input sound to the controller 24. The sound input unit 111 includes the microphone 11 described above. The sound input unit 111 can be an input interface to which an external microphone can be connected. The external microphone is connected to the input interface in a wired or wireless manner. The microphone connected to the input interface is, for example, a microphone included in earphones and the like that are connectable to electronic devices.

The sound output unit 121 outputs sound based on a signal input from the controller 24. The sound output unit 121 includes the speaker 12 described above. The sound output unit 121 can be an output interface to which an external speaker can be connected. The external speaker is connected to the output interface in a wired or wireless manner. The speaker connected to the output interface is, for example, a speaker included in earphones and the like that are connectable to electronic devices.

The touch sensor 131 detects contact of a thumb/finger and the like, and inputs a signal corresponding to the detected contact to the controller 24. The contact in a case where a signal corresponding thereto is input to the controller 24 is referred to as "contact operation".

The display 132 displays objects such as characters, images, signs, and diagrams on a screen thereof based on a signal input from the controller 24.

The communicator 21 performs wireless communications. Examples of wireless communication standards supported by the communicator 21 include communication standards of cellular phone such as 2G, 3G, and 4G and communication standards of short range communication. Examples of the communication standards of cellular phone include LTE (Long Term Evolution), W-CDMA (Wideband Code Division Multiple Access), WiMAX (Worldwide Interoperability for Microwave Access) (registered trademark), CDMA2000, PDC (Personal Digital Cellular), GSM (Global System for Mobile Communications) (registered trademark), and PHS (Personal Handy-phone System). Examples of the communication standards of short range communication includes IEEE802.11, Bluetooth (registered trademark), IrDA (Infrared Data Association), NFC (Near Field Communication), and WPAN (Wireless Personal Area Network). Examples of the communication standards of WPAN include ZigBee (registered trademark). When wireless communication is performed according to the communication standard of cellular phone, the communicator 21 establishes a wireless network between a base station and the communicator 21 via a channel allocated to each base station, and performs telephone communication and information communication between the base station and the communicator 21. By being connected to an AP (Access Point) in compliance with Wi-Fi (registered trademark), the communicator 21 can perform information communication via the AP.

The storage 22 stores therein programs and data. The storage 22 is also used as a work area in which processing results of the controller 24 are temporarily stored. The storage 22 can include a semiconductor storage medium and an arbitrary non-transitory storage medium such as a magnetic storage medium. The storage 22 can include a plurality of types of storage media. The storage 22 can also include a combination of a portable storage medium such as a memory card, an optical disk, and a magneto-optical disk and a reading device of a storage medium. The storage 22 can also include a storage device that is used as a temporary storage area such as a RAM (Random Access Memory). The programs stored in the storage 22 include applications to be executed in a foreground or a background, and a control program for supporting operations of the applications.

The storage 22 stores therein word dictionary data. Words and character strings handled as recognition objects in a sound recognition process and readings thereof are stored in the word dictionary data.

Acoustic models are stored in the storage 22. The acoustic models are data in which acoustic features of phenomes of sound for which sound recognition is performed are described. As the acoustic models, for example, the Hidden Markov Model can be used.

The storage 22 stores therein language models. The language models are data in which restrictions related to a sequence of phenomes, that is, probability distribution with regard to word strings, are described.

The storage 22 stores therein language processing data. The language processing data is data in which predetermined character strings are associated with predetermined processes that can be performed by the controller 24.

In some embodiments, fingerprint/thumbprint images of the user are stored in the storage 22.

In some embodiments, voiceprint information of the user is stored in the storage 22.

The sensor 23 detects a change of state around the sensor 23 itself and inputs a detection result to the controller 24. The sensor 23 can include an atmospheric sensor, a humidity sensor, and a temperature sensor. The atmospheric sensor detects a change of atmosphere around the sensor 23 itself. The humidity sensor detects a change of humidity around the sensor 23 itself. The temperature sensor detects a change of temperature around the sensor 23 itself.

The fingerprint/thumbprint sensor 14 detects contact of a thumb/finger of a user and the fingerprint/thumbprint of the finger/thumb, and inputs a detection result to the controller 24. As a method of detecting the fingerprint/thumbprint, an electrostatic capacitance method and an electric-field detection method are exemplified.

The controller 24 is an arithmetic processing unit. Examples of the arithmetic processing unit include, but are not limited to, a CPU (Central Processing Unit), an SoC (System-on-a-chip), an MCU (Micro Control Unit), an FPGA (Field-Programmable Gate Array), a coprocessor, etc. The controller 24 integrally controls operations of the electronic device 1 to realize various types of functions.

The controller 24 executes various types of control such as executing functions of the electronic device 1 and changing settings thereof, based on a signal input to the controller 24 correspondingly to a contact operation and the like detected by the touch sensor 131.

The controller 24 recognizes sound by analyzing a sound signal input to the sound input unit 111. Examples of sound recognition process include a method of determining similarity between an acoustic feature specified by an input sound signal and an acoustic model by comparing, and a method of obtaining text information indicating voiced contents using language models and word dictionary data. However, this method is only an example, and as far as the text information indicating voiced contents can be specified, the method of the sound recognition process is not limited thereto.

Upon recognizing sound, the controller 24 collates recognized character strings and language processing data. As a result of the collation, when the recognized character strings and the character strings of the language processing data match each other, the controller 24 performs a predetermined process corresponding to the matched character strings.

Based on at least one of detection results obtained by the touch sensor 131, the fingerprint/thumbprint sensor 14, and the sensor 23, the controller 24 determines whether a contact operation on the electronic device 1 can be performed.

When the controller 24 determines that, based on at least one of detection results obtained by the touch sensor 131, the fingerprint/thumbprint sensor 14, and the sensor 23, a contact operation on the electronic device 1 cannot be performed, reception of sound input is started by the sound input unit 111. The contact operation on the electronic device 1 is, for example, an operation on the touch sensor 131 and an operation on the fingerprint/thumbprint sensor 14. As for the electronic device 1, there is a case where, although contact with the electronic device 1 can be detected, a contact operation with which a predetermined signal is input to the controller 24 cannot be detected. Even in this case, the controller 24 determines that a contact operation on the electronic device 1 cannot be performed.

In some embodiments, when a value detected by an atmospheric sensor, which is a type of the sensor 23, changes to be greater than a predetermined value within a predetermined time period, the controller 24 determines that the electronic device 1 is under water. At this time, the controller 24 determines that a contact operation on the electronic device 1 cannot be performed and starts to receive sound input. It is also possible that the controller 24 starts to receive sound input when a positive change amount of the value detected by the atmospheric sensor is greater than a predetermined value.

In some embodiments, when values detected by a humidity sensor and a temperature sensor, which are respectively a type of the sensor 23, change to be greater than a predetermined value within a predetermined time period, the controller 24 determines that the electronic device 1 is in a bathroom. At this time, the controller 24 determines that a contact operation on the electronic device 1 cannot be performed and starts to receive sound input. It is also possible that the controller 24 starts to receive sound input when a positive change amount of the values detected by the humidity sensor and the temperature sensor is greater than a predetermined value.

In some embodiments, when the touch sensor 131 detects a change of an electrostatic capacitance in an area that is larger than a predetermined area, the controller 24 determines that the electronic device 1 is wet or under water. At this time, the controller 24 determines that a contact operation on the electronic device 1 cannot be performed and starts to receive sound input.

In some embodiments, when the touch sensor 131 detects a predetermined change of an electrostatic capacitance, the controller 24 determines that a finger/thumb of a user is wet or the electronic device 1 is wet or under water. At this time, the controller 24 determines that a contact operation on the electronic device 1 cannot be performed and starts to receive sound input.

In some embodiments, when the touch sensor 131 detects a change of an electrostatic capacitance but cannot perform a process corresponding to the change of the electrostatic capacitance, the controller 24 determines that a finger/thumb of a user is wet or the electronic device 1 is wet or under water. At this time, the controller 24 determines that a contact operation on the electronic device 1 cannot be performed and starts to receive sound input.

In some embodiments, when the fingerprint/thumbprint sensor 14 detects a predetermined change of an electrostatic capacitance, the controller 24 determines that a finger/thumb of a user is wet or the electronic device 1 is wet or under water. At this time, the controller 24 determines that a contact operation on the electronic device 1 cannot be performed and starts to receive sound input.

In some embodiments, the controller 24 converts a fingerprint/thumbprint detected by the fingerprint/thumbprint sensor 14 into an image. For example, in an electrostatic capacitance method, a magnitude distribution of an electrostatic capacitance is converted into a fingerprint/thumbprint image. In a voltage detection method, an intensity distribution of an electric field intensity is converted into a fingerprint/thumbprint image. The controller 24 verifies the fingerprint/thumbprint image. That is, the controller 24 performs collation (fingerprint/thumbprint authentication) to determine whether features of a fingerprint/thumbprint image detected by the fingerprint/thumbprint sensor 14 and features of a fingerprint/thumbprint image of a user are similar to each other. At the time of performing the collation, when the fingerprint/thumbprint sensor 14 cannot detect any fingerprint/thumbprint, the controller 24 determines that a finger/thumb of the user is wet or the electronic device 1 is wet or under water. At this time, the controller 24 determines that a contact operation on the electronic device 1 cannot be performed and starts to receive sound input.

In some embodiments, even when a detection result of the atmospheric sensor after having detected a value greater than a predetermined value changes to be within a predetermined range from the detection result before receiving sound input, the controller 24 keeps on receiving sound input for a predetermined time period.

In some embodiments, even when detection results of the humidity sensor and the temperature sensor after having detected values greater than respective predetermined values change to be within respective predetermined ranges from the detection results before receiving sound input, the controller 24 keeps on receiving sound input for a predetermined time period.

In some embodiments, the controller 24 receives sound input only when a screen of the display 132 is lighted up.

Upon determining that sound has been input, the controller 24 recognizes the input sound. In some embodiments, upon recognizing a first sound command included in input sound, the controller 24 performs a process corresponding to the first sound command.

In some embodiments, upon recognizing the first sound command included in input sound, the controller 24 cancels restrictions of functions on the electronic device 1. An example of the restrictions on the electronic device 1 is the security lock described above.

In some embodiments, upon recognizing the first sound command, the controller 24 verifies the input sound. That is, the controller 24 performs collation (voiceprint authentication) between a feature amount included in the input sound including the first sound command and a feature amount of a voice of a user registered in advance. As a result of the collation, when the controller 24 determines that the first sound command is voiced by the user, the controller 24 cancels the restrictions of the functions on the electronic device 1. As to which one of the sound recognition process and the voiceprint authentication is performed first is decided arbitrarily. When the sound recognition process is performed first, it is possible that the controller 24 uses only the feature amount included in the sound recognized as the first sound command for the voiceprint authentication.

In some embodiments, the controller 24 receives a second sound command within a time period since canceling the restrictions of the functions on the electronic device 1.

Subsequently, the first sound command and process corresponding thereto, and the second sound command and process corresponding thereto are described with reference to FIGS. 4A and 4B. FIGS. 4A and 4B are tables in which sound commands and processes corresponding to these sound commands are exemplified while they are respectively associated with one another. Upon recognizing the sound commands illustrated in FIGS. 4A and 4B, the controller 24 performs processes corresponding to these sound commands.

A predetermined sound command can be the first sound command or the second sound command. For example, as illustrated in FIGS. 4A and 4B, a sound command "activate calendar" can be used as either the first sound command or the second sound command. In this case, it is also possible to configure that one sound command can be used only as the first sound command or the second sound command.

The combinations of the first sound command and the second sound command are limited. For example, when the first sound command is "home", as the second sound command, all the commands illustrated in FIG. 4B can be used. However, for example, when the first sound command is "call to xxx", reception of the sound input is ended and the second sound command cannot be used. For example, when the first sound command is "activate calendar", the second sound command is limited to "schedule".

Figure 5:
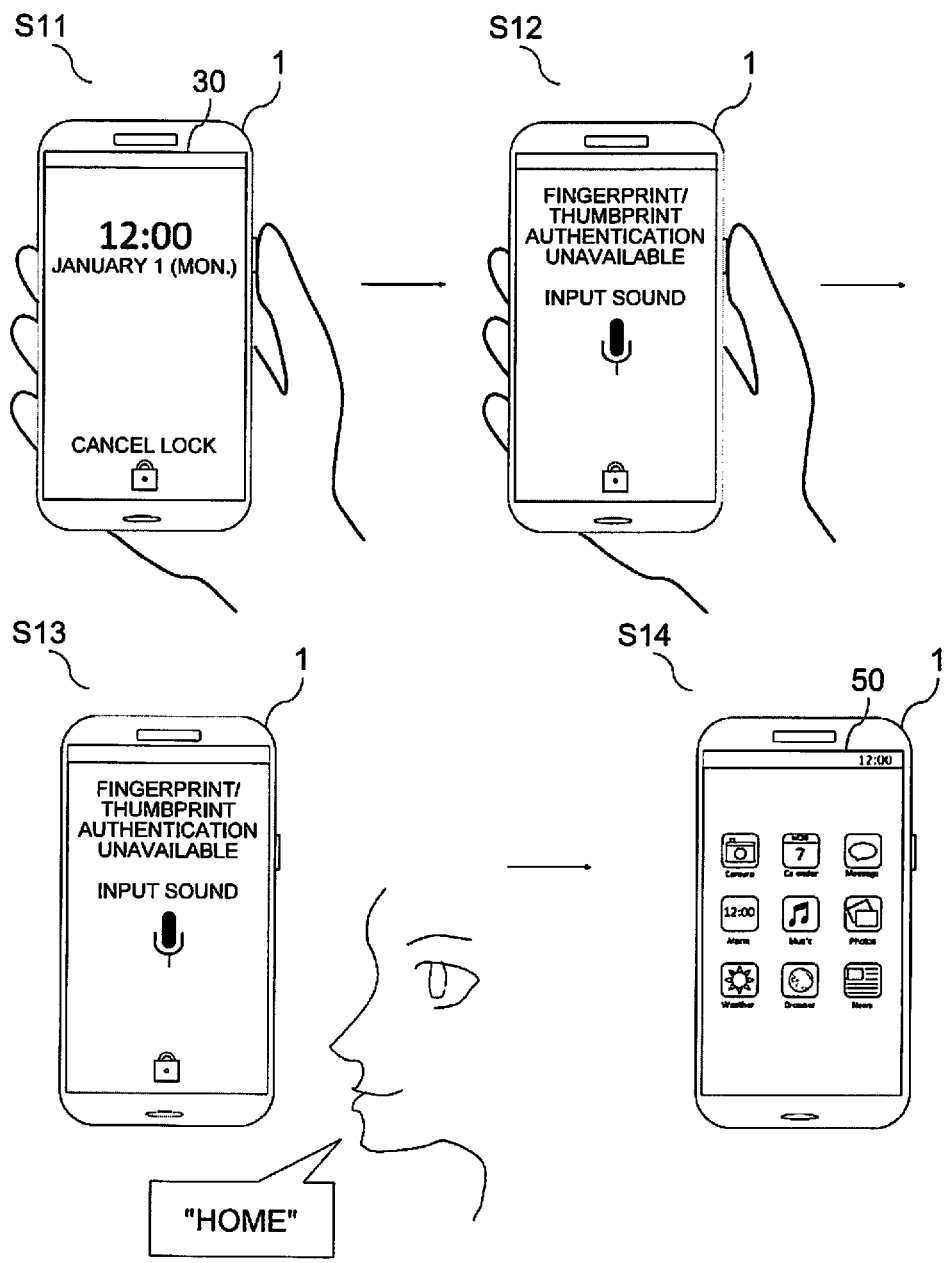
FIG. 5 is an image diagram illustrating examples of operations of the electronic device according to the embodiment.

Subsequently, operations of the electronic device 1 are described with reference to FIG. 5. FIG. 5 is image diagrams illustrating user operations and a screen of the electronic device 1 shifting correspondingly to the user operations.

On the electronic device 1 locked with the screen lock and the security lock, the user attempts canceling of the screen lock and the security lock by fingerprint/thumbprint authentication using the fingerprint/thumbprint sensor 14 (Step S11). At this time, the screen-lock screen 30 is displayed on the display 132.

For example, when the user's hand is wet, there is a case where a fingerprint/thumbprint of the user cannot be detected. At this time, the controller 24 displays a message prompting the user to perform sound input on the display 132 (Step S12).

The user utters a voice "home" to the electronic device 1 (Step S13).

The controller 24 recognizes the voice "home" via the sound input unit 111, and shifts the displayed screen on the display 132 to the home screen 50 (Step S14).

The controller 24 determines that the fingerprint/thumbprint of the user cannot be detected when the user's hand is wet, that is, determines that a contact operation cannot be performed, based on whether the fingerprint/thumbprint sensor 14 has detected a predetermined change of an electrostatic capacitance. For example, in a case of the fingerprint/thumbprint sensor 14 using an electrostatic capacitance method, when an object except for a finger/thumb touches the fingerprint/thumbprint sensor 14, the value of the electrostatic capacitance changes in a different manner when the finger/thumb touches the fingerprint/thumbprint sensor 14. Specifically, when the fingerprint/thumbprint sensor 14 is wet (is under water), there is less irregularities as compared to a case where a finger/thumb touches the fingerprint/thumbprint sensor 14, and the electrostatic capacitance of the entire detected area changes. Thus, the controller 24 can determine that a contact operation on the electronic device 1 cannot be performed.

According to the operations illustrated in FIG. 5, when the controller 24 is to perform collation between a fingerprint/thumbprint image detected by the fingerprint/thumbprint sensor 14 and a fingerprint/thumbprint image registered in advance, the fingerprint/thumbprint sensor 14 cannot detect any fingerprint/thumbprint, and thus it is determined that the finger/thumb of the user is wet. That is, the controller 24 determines that, based on the detection result of the fingerprint/thumbprint sensor 14, a contact operation on the electronic device 1 cannot be performed. At this time, the controller 24 starts to receive sound input by the sound input unit 111. When the sound input is being received, upon recognition of the first sound command, the controller 24 performs processes corresponding to the first sound command (canceling a security-lock state and shifting to the home screen 50). Due to the operations described above, the operability of the electronic device 1 is improved when a contact operation is difficult to perform.

In FIG. 5, the time period where the sound input is received can be set only as a time period where the display 132 is lighted up. Due to this setting, it is possible to configure that sound input is performed only when the user wishes to, so that erroneous recognition of sound can be suppressed.

In FIG. 5, it is possible that the processes corresponding to the first sound command are performed only when the feature amount of the sound recognized as the first sound command and the feature amount of the voice of the user are collated and it is determined that the first sound command has been voiced by the user. Due to this configuration, the security of the electronic device 1 can be improved while improving the operability of the electronic device 1 when a contact operation is difficult to perform.

Figure 6:
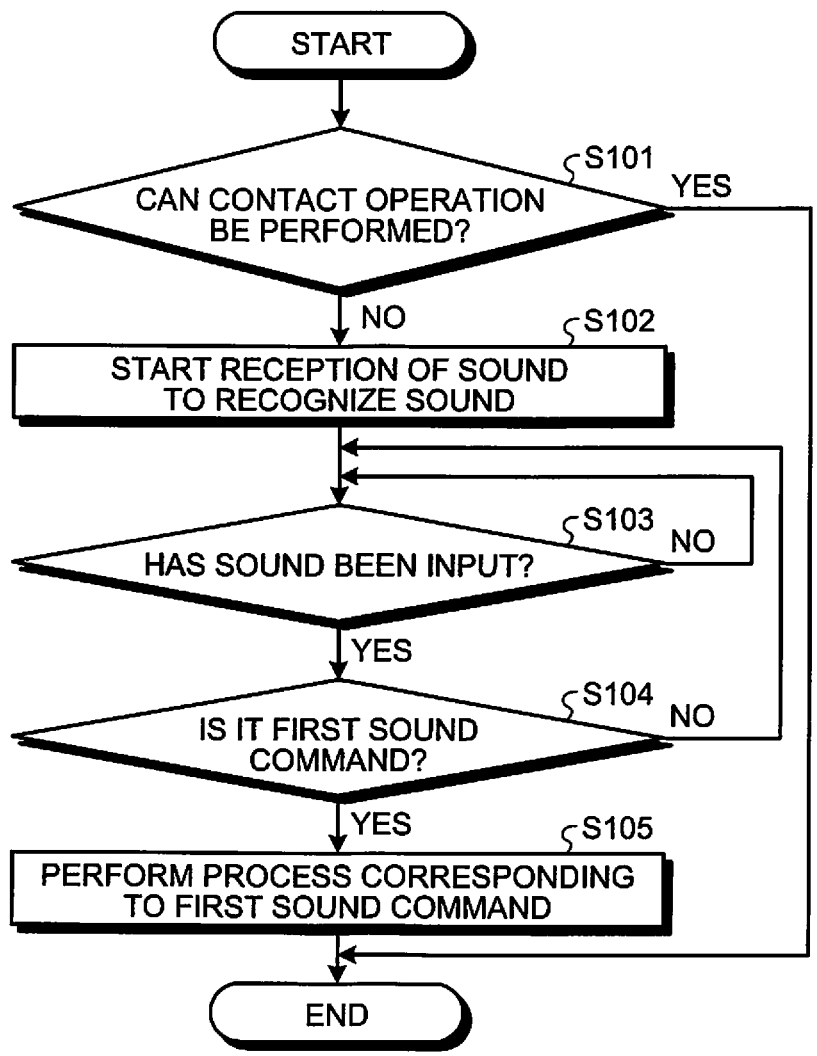
FIG. 6 is a flowchart illustrating an example of control executed by the electronic device according to the embodiment.

Subsequently, control executed by the electronic device 1 is described with reference to FIG. 6. FIG. 6 is a flowchart illustrating an example of the control of the electronic device 1. The control of the electronic device 1 in FIG. 6 corresponds to the operations on the electronic device 1 in FIG. 5.

The controller 24 determines whether a contact operation can be performed (Step S101). When it is determined that a contact operation can be performed (Yes at Step S101), the controller 24 ends the process. When it is determined that a contact operation cannot be performed (No at Step S101), the controller 24 starts reception of sound input to recognize the sound (Step S102). In FIG. 5, whether a contact operation cannot be performed is determined whether the fingerprint/thumbprint sensor 14 has been able to detect a fingerprint/thumbprint when collation between a fingerprint/thumbprint image detected by the fingerprint/thumbprint sensor 14 and a fingerprint/thumbprint image of a user is to be performed.

The controller 24 determines whether sound has been input (Step S103). When it is determined that sound has not been input (No at Step S103), the controller 24 repeats the process at Step S103. When it is determined that sound has been input (Yes at Step S103), the controller 24 proceeds to Step S104.

The controller 24 recognizes the input sound and determines whether the input sound is the first sound command (Step S104). When it is determined that the input sound is not the first sound command (No at Step S104), the controller 24 returns the process to Step S103. When it is determined that the input sound is the first sound command (Yes at Step S104), the controller 24 proceeds to Step S105. The first sound command is a voice "home" in FIG. 5.

The controller 24 performs processes corresponding to the first sound command (Step S105). The processes corresponding to the first sound command are canceling the security state and shifting the display of the display 132 to the home screen 50 in FIG. 5.

The process of determining whether a contact operation cannot be performed at Step S101 can be performed based on whether a detection result of an atmospheric sensor, which is a type of the sensor 23, has changed to be greater than a predetermined value within a predetermined time period. For example, when the electronic device 1 is under water, the value to be detected by the atmospheric sensor becomes greater than that detected above the ground. Due to this configuration, the controller 24 determines that the operation on the fingerprint/thumbprint sensor 14 or the touch sensor 131 cannot be performed.

The process of determining whether a contact operation cannot be performed at Step S101 can be also performed based on whether detection results of a humidity sensor and a temperature sensor, which are respectively a type of the sensor 23, have changed to be greater than respective predetermined values within a predetermined time period. For example, when the electronic device 1 is in a bathroom, the humidity and the temperature detected by these sensors become higher than those detected in a normal room. Due to this configuration, the controller 24 determines that the operation on the fingerprint/thumbprint sensor 14 or the touch sensor 131 cannot be performed.

The process of determining whether a contact operation cannot be performed at Step S101 can be also performed based on whether the touch sensor 131 has detected a change of an electrostatic capacitance in an area larger than a predetermined area. For example, when the electronic device 1 is under water, the electronic capacitance changes in an area larger than that operated with a finger. Due to this phenomenon, the controller 24 determines that the operation on the fingerprint/thumbprint sensor 14 or the touch sensor 131 cannot be performed.

The process of determining whether a contact operation cannot be performed at Step S101 can be also performed based on whether the touch sensor 131 has detected a predetermined amount of a change of an electrostatic capacitance. For example, when the electronic device 1 is wet, the electrostatic capacitance changes in a plurality of areas on the touch sensor 131. At this time, for example, on a screen that is displayed on the display 132 and has no processing with regard to multi-touch operations allocated thereto, the electrostatic capacitance in the plurality of areas changes in some cases. Due to this phenomenon, the controller 24 can determine that the operation on the touch sensor 131 cannot be performed.

The process of determining whether a contact operation cannot be performed at Step S101 can be also performed based on whether the controller 24 can perform processes corresponding to a change of an electrostatic capacitance when the touch sensor 131 has detected the change of the electrostatic capacitance. For example, when the display 132 is wet and the electrostatic capacitance on a wet portion changes, even when the electrostatic capacitance changes due to an actual contact operation, there is a possibility that processes corresponding to the contact operation (the change of the electrostatic capacitance) cannot be performed correctly. Due to this phenomenon, the controller 24 can determine that the operation on the touch sensor 131 cannot be performed.

At Step S101, when the process of determining whether a contact operation cannot be performed is performed based on whether the detection results obtained by the atmospheric sensor or the humidity sensor and the temperature sensor have become greater than respective predetermined values, even after the sensors described above have detected values greater than the respective predetermined values, the detections can be continued. At this time, even when the detection results after having detected values greater than respective predetermined values change to be within respective predetermined ranges from the detection results before receiving sound input, the sound input can be received for a predetermined time period. For example, there is a possibility that the electronic device 1 is still wet for several minutes after the user under water with the electronic device 1 has come out of the water, or after the user in a bathroom with the electronic device 1 has come out of the bathroom. In such cases, even when the values detected by the sensors return to a value before having detected a large value, by receiving sound input for a predetermined time period, the user can continue to operate the electronic device 1 with sound, and thus the operability of the electronic device 1 can be improved.

After the process at Step S101, it is possible to add a process of determining whether the display 132 is lighted up. That is, as described above, it is possible to set that the time period where sound input is received is only a time period where the display 132 is lighted up.

In FIG. 6, after the process at Step S105, it is possible to add a step of determining whether sound has been input, a step of determining whether the sound is the second sound command, and a step of performing processes corresponding to the second sound command when the sound is the second sound command. Due to these additions, when a contact operation is difficult to perform, it is possible to perform more complicated processes with sound, and thus the operability of the electronic device 1 can be improved.

It is possible to provide an electronic device that can improve its operability when a contact operation is difficult to perform.

Although the application has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An electronic device, comprising:
   at least one sensor;
   a sound input unit; and
   at least one controller, wherein when the at least one controller determines that a contact operation on the electronic device is not able to be performed based on a detection result of the sensor, the at least one controller is configured to start reception of sound input by the sound input unit to recognize the sound,
   wherein when the detection result, after having detected a value greater than a predetermined value, changes to be within a predetermined range from the detection result before receiving the sound input, the at least one controller is further configured to receive the sound input for a predetermined time period.

2. The electronic device according to claim 1, wherein the at least one sensor includes an atmospheric sensor, and when a detection result of the atmospheric sensor changes to be greater than a predetermined value within a predetermined time period, the at least one controller is further configured to determine that the contact operation is not able to be performed.

3. The electronic device according to claim 1, wherein the at least one sensor includes a humidity sensor and a temperature sensor, and
   when detection results of the humidity sensor and the temperature sensor change to be greater than respective predetermined values within a predetermined time period, the at least one controller is further configured to determine that the contact operation is not able to be performed.

4. The electronic device according to claim 1, wherein the at least one sensor includes a touch sensor.

5. The electronic device according to claim 4, wherein when the touch sensor detects a change of an electrostatic capacitance in an area larger than a predetermined area, the at least one controller is further configured to determine that the contact operation is not able to be performed.

6. The electronic device according to claim 4, wherein when the touch sensor detects a predetermined amount of a change of an electrostatic capacitance, the at least one controller is further configured to determine that the contact operation is not able to be performed.

7. The electronic device according to claim 4, wherein in a case where the touch sensor has detected a change of an electrostatic capacitance, when a process corresponding to the change of the electrostatic capacitance is not able to be performed, the at least one controller is further configured to determine that the contact operation is not able to be performed.

8. The electronic device according to claim 1, wherein the at least one sensor includes a fingerprint/thumbprint sensor.

9. The electronic device according to claim 8, wherein when the fingerprint/thumbprint sensor detects a predetermined amount of a change of an electrostatic capacitance, the at least one controller is further configured to determine that the contact operation is not able to be performed.

10. The electronic device according to claim 9, wherein in a case where verification of a fingerprint/thumbprint image is to be performed, when the fingerprint/thumbprint sensor is not able to detect the fingerprint/thumbprint, the at least one controller is further configured to determine that the contact operation is not able to be performed.

11. The electronic device according to claim 1, further comprising a display, wherein the at least one controller is further configured to receive the sound input during a time period where a screen of the display is lighted up.

12. The electronic device according to claim 11, wherein upon recognizing a first sound command included in the input sound, the at least one controller is further configured to perform a process corresponding to the first sound command.

13. The electronic device according to claim 12, wherein upon recognizing the first sound command included in the input sound, the at least one controller is further configured to cancel restrictions of functions on the electronic device.

14. The electronic device according to claim 13, wherein upon recognizing the first sound command, the at least one controller is further configured to verify the input sound including the first sound command, and when it is determined that the first sound command has been voiced by the user, the at least one controller is further configured to cancel the restrictions of the functions.

15. The electronic device according to claim 14, wherein the at least one controller is further configured to receive a second sound command during a predetermined time period after canceling the restrictions of the functions.

16. A control method of an electronic device including a sensor, a sound input unit, and at least one controller, the control method comprising:
  determining that, based on a detection result of the sensor, a contact operation on the electronic device is not able to be performed;
  starting reception of sound input by the sound input unit to recognize the sound; and
  receiving the sound input for a predetermined time period when the detection result, after the sensor having detected a value greater than a predetermined value, changes to be within a predetermined range from the detection result before receiving the sound input.

17. A non-transitory storage medium that stores a computer program for causing an electronic device including a sensor, a sound input unit, and at least one controller to execute:
  determining that, based on a detection result of the sensor, a contact operation on the electronic device is not able to be performed;
  starting reception of sound input by the sound input unit to recognize the sound; and
  receiving the sound input for a predetermined time period when the detection result, after the sensor having detected a value greater than a predetermined value, changes to be within a predetermined range from the detection result before receiving the sound input.

* * * * *